US010411455B2

(12) United States Patent
Coenegracht et al.

(10) Patent No.: US 10,411,455 B2
(45) Date of Patent: Sep. 10, 2019

(54) RE-ENTERABLE ENCLOSURE

(71) Applicant: CommScope Connectivity Belgium BVBA, Kessel-Lo (BE)

(72) Inventors: Philippe Coenegracht, Hasselt (BE); Diederik Houben, Berbroek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/109,470

(22) Filed: Aug. 22, 2018

(65) Prior Publication Data

US 2019/0013661 A1 Jan. 10, 2019

Related U.S. Application Data

(63) Continuation of application No. 15/292,976, filed on Oct. 13, 2016, now Pat. No. 10,084,302, which is a
(Continued)

(51) Int. Cl.
*H02G 15/013* (2006.01)
*G02B 6/44* (2006.01)
(Continued)

(52) U.S. Cl.
CPC ......... *H02G 15/013* (2013.01); *G02B 6/4444* (2013.01); *H02G 3/083* (2013.01); *H02G 3/14* (2013.01); *H02G 3/22* (2013.01)

(58) Field of Classification Search
CPC .................................................. H02G 15/013
(Continued)

(56) References Cited

U.S. PATENT DOCUMENTS 4,572,923 A 2/1986 Castellani et al.
4,731,501 A 3/1988 Clark et al.
(Continued)

FOREIGN PATENT DOCUMENTS

DE 30 25 766 A1 1/1982
DE 31 29 489 A1 2/1983
(Continued)

OTHER PUBLICATIONS

International Search Report for International Application No. PCT/EP2013/063495 dated Feb. 6, 2014 (5 pages).
(Continued)

*Primary Examiner* — Stanley Tso
(74) *Attorney, Agent, or Firm* — Merchant & Gould P.C.

(57) ABSTRACT

An enclosure (20, 220) includes a housing (22, 222) and a sealing unit (48, 42*a*, 232) that mounts within a sealing unit opening (28, 230) of the housing. The sealing unit (48, 42*a*, 232) provides a peripheral seal between the housing (22, 222) and the sealing unit (48, 42*a*, 232) and provides seals around cable ports (50). The sealing unit (48, 42*a*, 232) can be mounted to and removed from the housing (222) through the sealing unit opening (28, 230). The base (26) lacks a permanent retention structure (55, 155*a*) at the outer end of the base (26) for retaining the sealing unit (48, 42*a*, 232) in the base (26). A cover (24) is removable from the base (26) without requiring the sealant arrangement (52, 236) to be de-pressurized. A fastening arrangement (55, 155*a*) releasably retains the sealing unit (48, 42*a*, 232) in the sealing unit opening (28, 230).

14 Claims, 23 Drawing Sheets

Related U.S. Application Data continuation of application No. 14/412,368, filed as application No. PCT/EP2013/063495 on Jun. 27, 2013, now Pat. No. 9,502,878.

(60) Provisional application No. 61/667,257, filed on Jul. 2, 2012.

(51) Int. Cl.
*H02G 3/22* (2006.01)
*H02G 3/08* (2006.01)
*H02G 3/14* (2006.01)

(58) Field of Classification Search
USPC .......................................................... 174/564
See application file for complete search history.

(56) References Cited

U.S. PATENT DOCUMENTS

| | | | |
|---|---|---|---|
| 5,446,823 A | 8/1995 | Bingham et al. | |
| 5,764,844 A | 6/1998 | Mendes | |
| 5,774,618 A | 6/1998 | Jones | |
| 5,775,702 A | 7/1998 | Laeremans et al. | |
| 6,046,406 A | 4/2000 | Milanowski et al. | |
| 6,088,886 A | 7/2000 | Gyongyosi | |
| 6,100,472 A | 8/2000 | Foss | |
| 6,218,620 B1 | 4/2001 | Michel | |
| 6,275,641 B1 | 8/2001 | Daoud | |
| 7,038,137 B2 | 5/2006 | Grubish et al. | |
| 8,604,360 B2 | 12/2013 | Knorr et al. | |
| 2002/0146229 A1 | 10/2002 | Roberts | |
| 2003/0156798 A1 | 8/2003 | Cull | |
| 2004/0080119 A1 | 4/2004 | Goll | |
| 2004/0100028 A1 | 5/2004 | Desard et al. | |
| 2006/0063418 A1 | 3/2006 | Motzigkeit | |
| 2007/0007038 A1* | 1/2007 | Cox | H02G 3/088 174/650 |
| 2007/0047895 A1* | 3/2007 | Parikh | G02B 6/4442 385/135 |
| 2009/0304341 A1* | 12/2009 | Shimirak | H02G 15/013 385/135 |
| 2009/0309313 A1 | 12/2009 | Knorr et al. | |
| 2011/0217017 A1* | 9/2011 | Drouard | H02G 3/088 385/135 |
| 2012/0048617 A1 | 3/2012 | Mihara et al. | |
| 2013/0014974 A1 | 1/2013 | Burke et al. | |
| 2013/0020771 A1 | 1/2013 | Vanhentenrijk et al. | |
| 2014/0041893 A1 | 2/2014 | Adams et al. | |
| 2014/0182928 A1 | 7/2014 | Starke et al. | |
| 2014/0219622 A1 | 8/2014 | Coan et al. | |
| 2015/0137461 A1 | 5/2015 | Coenegracht et al. | |
| 2015/0168664 A1 | 6/2015 | Coenegracht et al. | |
| 2015/0357809 A1 | 12/2015 | Coenegracht | |

FOREIGN PATENT DOCUMENTS

| | | |
|---|---|---|
| DE | 33 22 809 A1 | 1/1985 |
| DE | 20 2006 006 019 U1 | 6/2006 |
| DE | 20 2011 003 754 U1 | 6/2012 |
| DE | 10 2012 112 510 A1 | 6/2014 |
| EP | 0 442 941 B1 | 1/1995 |
| EP | 0 638 976 A1 | 2/1995 |
| EP | 0 652 619 A1 | 5/1995 |
| EP | 0 587 616 B1 | 7/1996 |
| EP | 0 426 658 B1 | 11/1996 |
| EP | 0 681 598 B1 | 9/1997 |
| EP | 0 841 734 A1 | 5/1998 |
| EP | 1 710 882 A2 | 10/2006 |
| EP | 2 330 706 A1 | 6/2011 |
| WO | 95/24756 A1 | 9/1995 |
| WO | 95/25978 A1 | 9/1995 |
| WO | 96/32660 A1 | 10/1996 |
| WO | 97/42693 A1 | 11/1997 |
| WO | 99/49548 A1 | 9/1999 |
| WO | 99/56370 A1 | 11/1999 |
| WO | 01/28057 A1 | 4/2001 |
| WO | 02/33796 A2 | 4/2002 |
| WO | 02/063736 A1 | 8/2002 |
| WO | 02/097488 A2 | 12/2002 |
| WO | 2005/027290 A1 | 3/2005 |
| WO | 2005/119111 A1 | 12/2005 |
| WO | 2006/118747 A1 | 11/2006 |
| WO | 2007/118548 A1 | 10/2007 |
| WO | 2007/137717 A1 | 12/2007 |
| WO | 2008/112118 A1 | 9/2008 |
| WO | 2009/148604 A1 | 12/2009 |
| WO | 2011/067190 A2 | 6/2011 |
| WO | 2012/152789 A2 | 11/2012 |
| WO | 2014/095462 A1 | 6/2014 |

OTHER PUBLICATIONS

International Search Report for International Application No. PCT/EP2013/063486 dated Feb. 6, 2014 (6 pages).
International Search Report for International Application No. PCT/EP2013/063497 dated Feb. 6, 2014 (6 pages).
International Search Report for International Application No. PCT/EP2013/063500 dated Feb. 6, 2014 (7 pages).
Extended European Search Report for corresponding European Patent Application No. 17180616.9 dated Oct. 23, 2017, 5 pages.

* cited by examiner

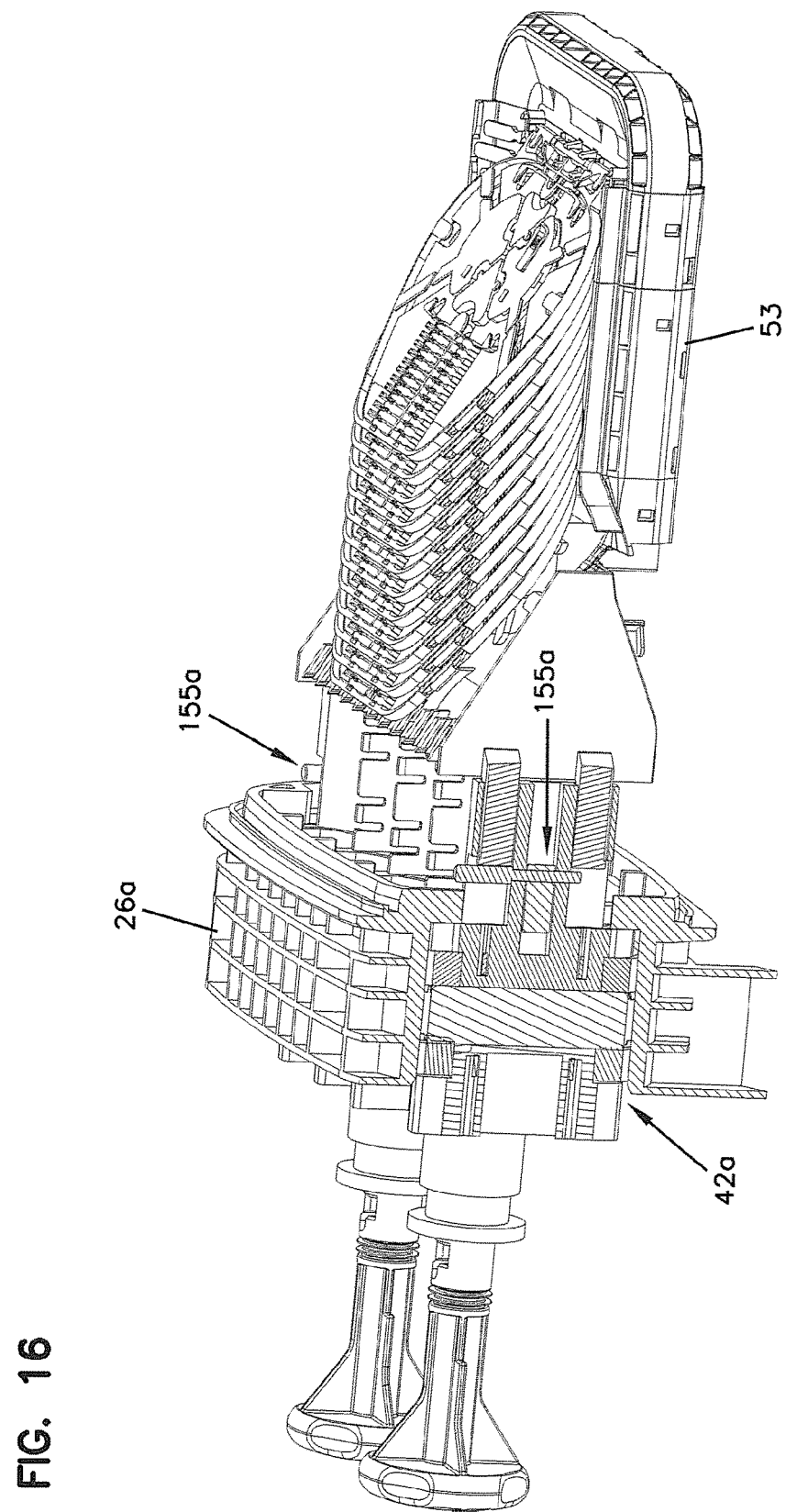

RE-ENTERABLE ENCLOSURE

This application is a Continuation of U.S. application Ser. No. 15/292,976, filed 13 Oct. 2016, now U.S. Pat. No. 10,084,302, which is a Continuation of U.S. application Ser. No. 14/412,368, filed 31 Dec. 2014, now U.S. Pat. No. 9,502,878, which is a National Stage Application of PCT/EP2013/063495, filed 27 Jun. 2013, which claims benefit of U.S. Provisional Ser. No. 61/667,257, filed 2 Jul. 2012 and which applications are incorporated herein by reference. To the extent appropriate, a claim of priority is made to each of the above disclosed applications.

TECHNICAL FIELD

The present disclosure relates generally to enclosures used in telecommunications networks. More particularly, the present disclosure relates to sealed enclosures for use in telecommunications networks.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

One aspect of the present disclosure relates to a dome-style enclosure having a split housing having a dome, a base and sealing unit that fits within the base. In certain embodiments, the dome can be removed from the base without disturbing or depressurizing the sealing unit. This allows internal optical components (e.g., splice trays holding splices, splitter trays holding optical splitters, wavelength division multipliers, fiber management trays, etc.) to be accessed and serviced without disturbing or depressurizing the sealing unit. This is advantageous because repeatedly disturbing the sealing unit increases the likelihood of leak paths developing. In certain embodiments, the sealing unit can be removed from the base without detaching the dome from the base. For example, in certain embodiments, the sealing unit can be removed from the base through an outer end of the base. In certain embodiments, a frame supporting optical components is coupled to and carried with the sealing unit such that both the sealing unit and the frame can be removed from the base through the outer end of the base. In certain embodiments, the base is adapted to be connected to an outside environmental structure such as a pole, wall, bracket, handhold or other structure. The above-described configuration is advantageous because the sealing unit can be easily accessed and removed for maintenance or for adding additional cables. Additionally, the ability to remove the sealing unit and the frame from the housing of the enclosure through the outer end of the base allows the base to remain connected to an outside environmental structure while the sealing unit and optical components supported on the frame are accessed for servicing. Thus, it is not necessary to remove the enclosure housing from the environmental structure each time cables are intended to be inserted through or removed from the sealing block. Instead, the sealing unit and the frame can be removed from the housing as a unit and carried to a servicing location (e.g., a servicing table/station at a service truck) while the enclosure housing remains attached to the outside environmental structure.

Another aspect of the present disclosure relates to a telecommunications enclosure having a housing that defines an opening in which a cable sealing unit mounts. The cable sealing unit is removable from the opening through an outer end of the opening. In certain embodiments, the housing is adapted to be connected to an outside environmental structure such as a pole, wall, bracket, handhold or other structure. The ability to remove the sealing unit and the frame from the housing of the enclosure through the outer end of the housing opening allows the housing to remain connected to an outside environmental structure while the sealing unit and optical components supported on the frame are accessed for servicing. Thus, it is not necessary to remove the enclosure housing from the environmental structure each time cables are intended to be inserted through or removed from the sealing block. Instead, the sealing unit and the frame can be removed from the housing as a unit and carried to a servicing location (e.g., a servicing table/station at a service truck) while the enclosure housing remains attached to the outside environmental structure. In certain embodiments, the sealing unit includes a sealant arrangement and an actuation arrangement for pressurizing the sealant arrangement to provide effective sealing around cable routed through the sealing unit and to provide a peripheral seal between the sealing unit and the housing. The actuation arrangement includes inner and outer pressurization structures between which the sealant arrangement is pressurized. In certain embodiments, the cables are anchored to the inner pressurization structure, and the inner pressurization structure is secured to the housing by a releasable attachment arrangement. Anchoring the cables to the inner pressurization structure and retaining/locking the inner pressurization structure relative to the enclosure housing prevents the inner pressurization structure from moving or floating when loads are applied to the inner pressurization structure through the cables. Restricting movement of the inner pressurization structure prevents loading from being transferred to optical fibers within the enclosure and assists in limiting movement of the cables within the sealing unit. By limiting movement of cables within the sealing unit, seal integrity is maintained. By releasing the connection between the inner pressurization structure and the enclosure housing allows the sealing unit to be removed from the enclosure housing through the outer end of the opening in which the sealing unit is mounted. The releasable attachment arrangement can be moved between an attaching position and a non-attaching position. In certain embodiments, the releasable attachment arrangement is configured to be accessed from outside the enclosure so that the attachment arrangement can removed between the attaching position and the non-attaching position from outside the enclosure. In certain embodiments, the releasable attachment arrangement can be accessed from inside the enclosure by removing a cover of the enclosure.

Another aspect of the present disclosure relates to an enclosure for containing and protecting telecommunications equipment components such as optical fiber, optical splices, optical splitters and other components/elements. In certain embodiments, the enclosure has a sealed cable entrance/exit location and a separate access location for accessing the telecommunications components within the enclosure. In one embodiment, the enclosure includes a sealing unit that is pressurized by an actuator, and a separate access opening that allows the telecommunications components within the enclosure to be accessed without requiring the sealing unit to be depressurized.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

BRIEF DESCRIPTION OF THE DRAWINGS

FIG. 16 is a cross-sectional view taken along section line 16-16 of FIG. 15;

DETAILED DESCRIPTION

Figure 5:
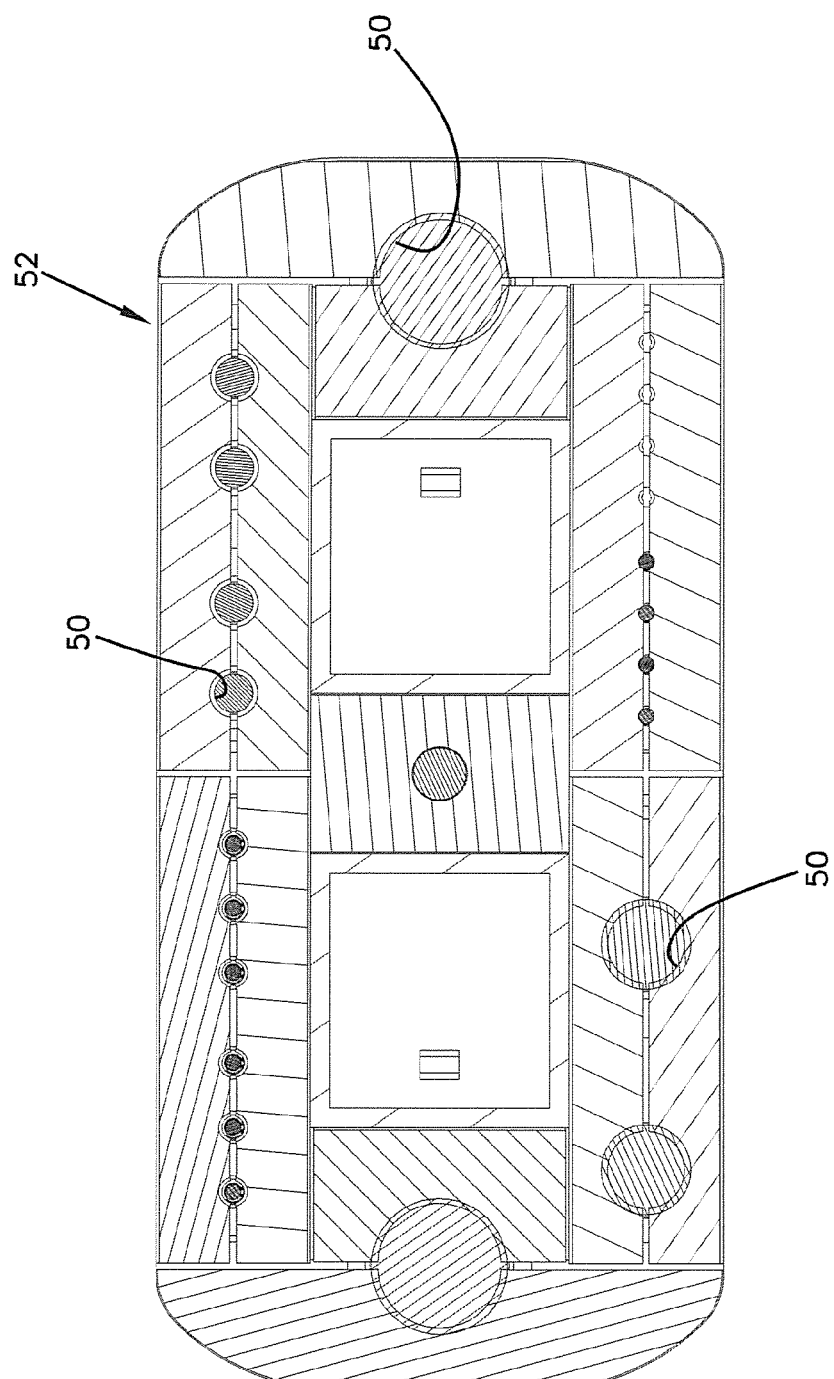
FIG. 5 is a cross-sectional view taken along section line 5-5 of FIG. 3.

FIGS. 1-14 illustrate a telecommunications enclosure 20 in accordance with the principles of the present disclosure. The enclosure 20 includes a housing 22 including a dome-style cover 24 and a base 26. The cover 24 has an open end 28 positioned opposite from a closed end 30. The cover also includes a cover flange 32 that extends around a periphery of the cover 24 at the open end 28 of the cover 24. The base 26 is depicted as a hollow sleeve having an inner end 34 and an outer end 36. The base 26 includes a base flange 38 that extends around a periphery of the base at the inner end 34 of the base 26. The cover 24 is elongated along a central axis 40 that extends from the open end 28 to the closed end 38 of the cover 24. The enclosure 20 also includes a clamp 42 having a channel that receives the cover flange 32 and the base flange 38 to couple the cover 24 and the base 22 together. The enclosure 20 further includes a sealing unit 48 that fits within the base 26. A sealing unit 48 defines a plurality of cable ports 50. The sealing unit 48 includes a sealant arrangement 52 (see FIG. 5) for sealing the cable ports 50 and for providing a peripheral seal between the base 26 and the cable sealing unit 48. The enclosure further includes an actuation arrangement 56 carried with the sealing unit 48 for pressurizing the sealant arrangement 52 within the base 26. The enclosure also includes a frame 53 coupled to the sealing unit 48 such that the frame 53 is carried with the sealing unit 48 when the sealing unit is inserted into or removed from the base 26. A plurality of optical components (e.g., splice trays supporting optical splices and managing optical fibers routed to the splices, splitter trays supporting optical splitters and managing optical fibers routed to and from the splitters, fiber management trays, trays supporting wavelength division multipliers, etc.). By unlatching the clamp 42, the cover 24 can be removed from the base 26 without requiring the sealant arrangement 52 to be de-pressurized.

Conventional dome-style enclosures typically include a base having an outer end with a permanent lip/flange for axially retaining the sealing unit within the base. Thus, the sealing unit cannot be removed from the outer end of the base while the base is attached to the dome-style cover. Instead, it is necessary to remove the dome-style cover from the base and then remove the sealing unit from the base by separating the base in half or by pulling the sealing unit thorough the inner end of the base. In contrast, the base 26 of the depicted embodiment lacks a permanent retention structure at the outer end 36 of the base 26 for retaining the sealing unit 48 within the base 26. Instead, the sealing unit 48 is retained in the base 26 by a retention arrangement 55 (see FIGS. 11-14) that is movable between a retaining position and a non-retaining position. When the sealing unit 48 is mounted in the base 26 while the retention arrangement 55 is in the retaining position, the sealing unit 48 is prevented from moving axially within the base 26 and is prevented from being removed from the base 26 through the outer end 36 of the base 26. By de-actuating the sealing unit 48 to depressurize the sealing arrangement 52 and by moving the retention arrangement 55 to a non-retaining position, the sealing unit 48 can be removed from the base 26 by sliding the sealing unit 48 from the base 26 through the outer end 36 of the base 26.

Figure 1:
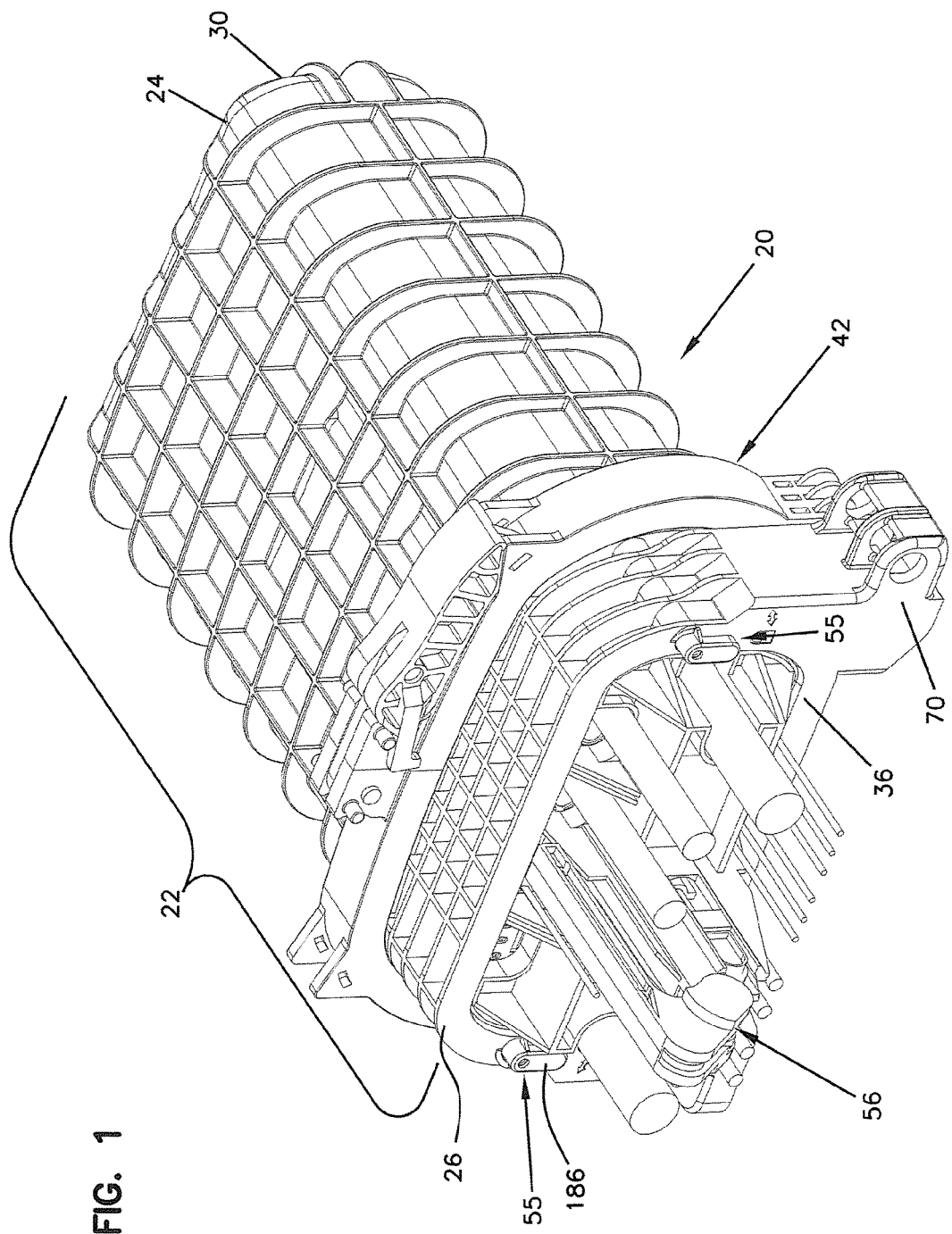
FIG. 1 is a perspective view of a telecommunications enclosure in accordance with the principles of the present disclosure.
Figure 2:
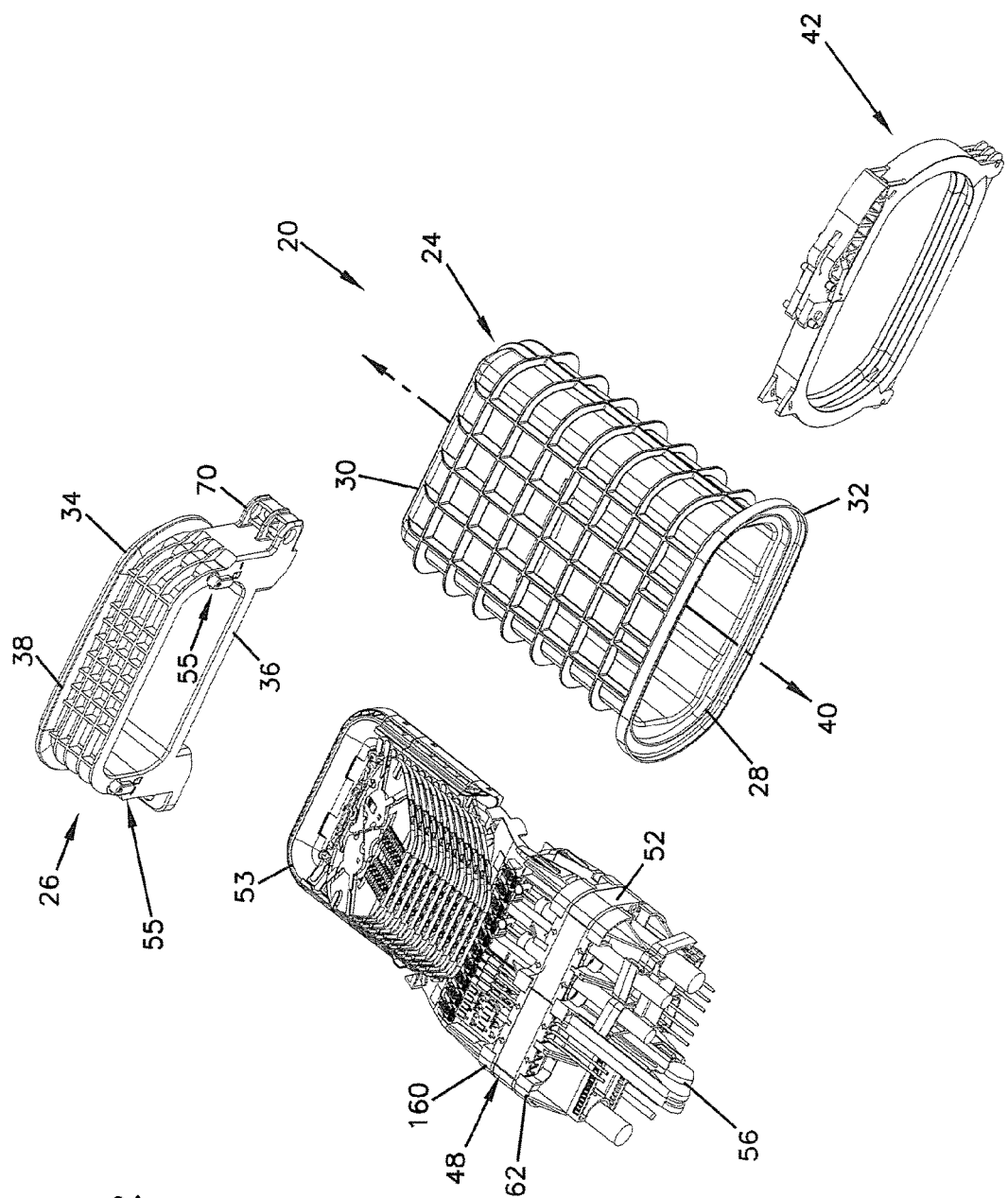
FIG. 2 is an exploded view of the telecommunications enclosure of FIG. 1.
Figure 3:
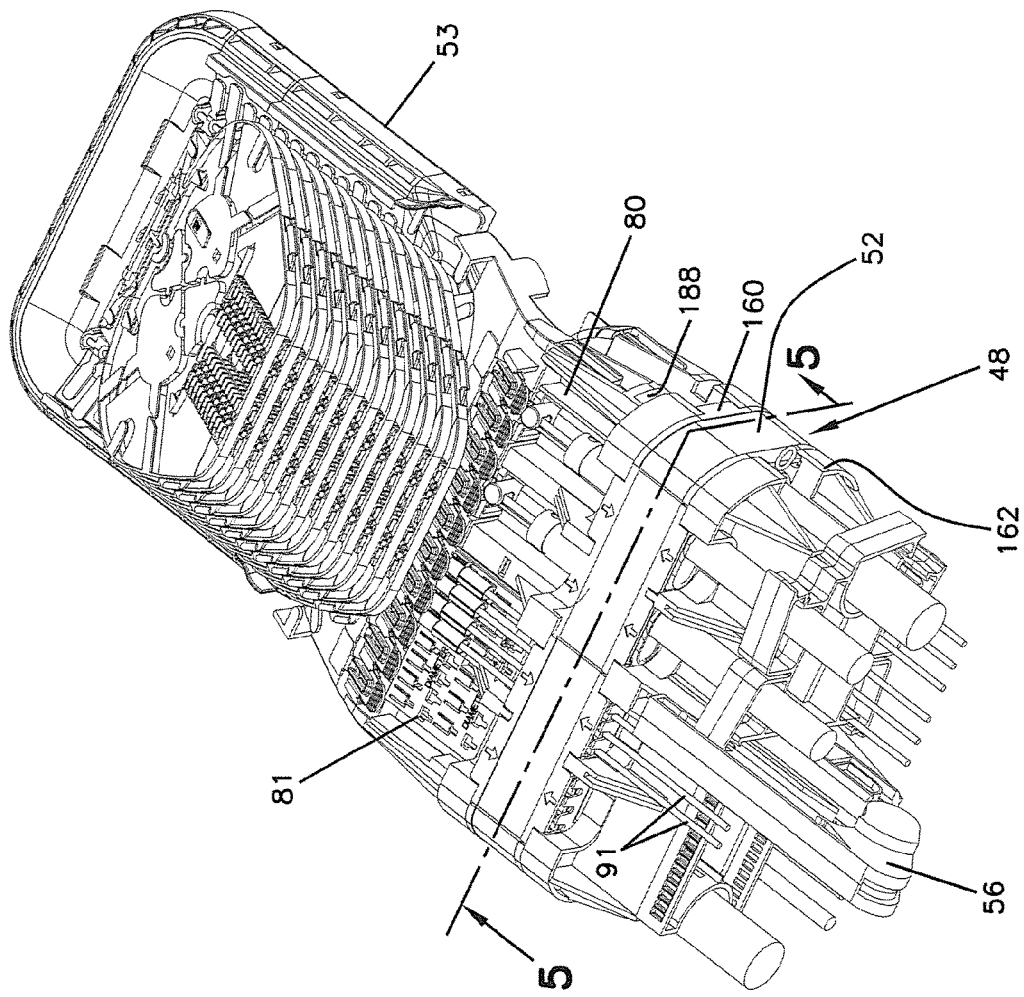
FIG. 3 is a perspective view a sealing unit and telecommunication component support frame of the telecommunications enclosure of FIG. 1.
Figure 4:
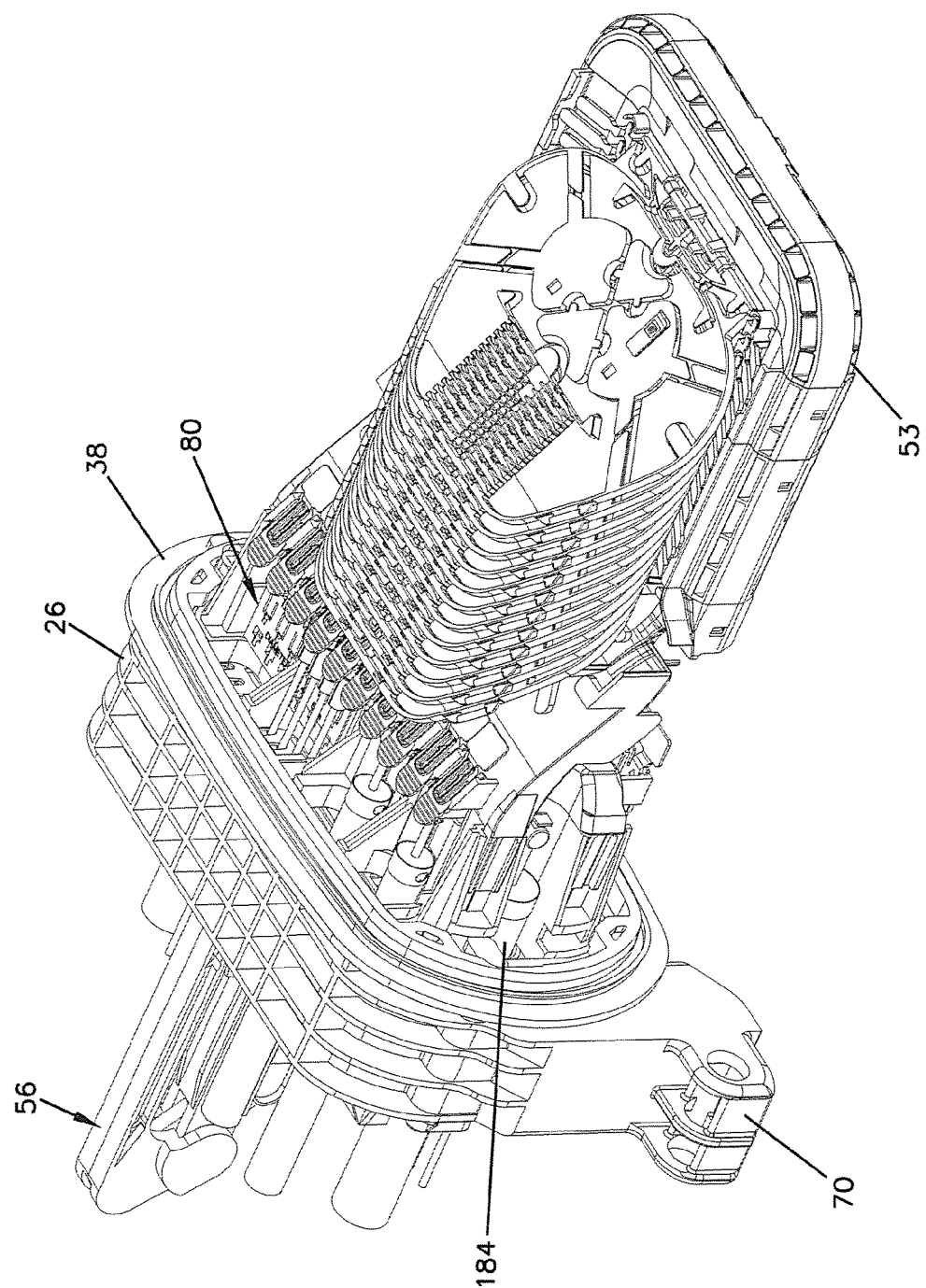
FIG. 4 is a perspective view of the sealing unit and telecommunication component support frame of FIG. 3 shown inserted through a base of the telecommunications enclosure of FIG. 1.
Figure 7:
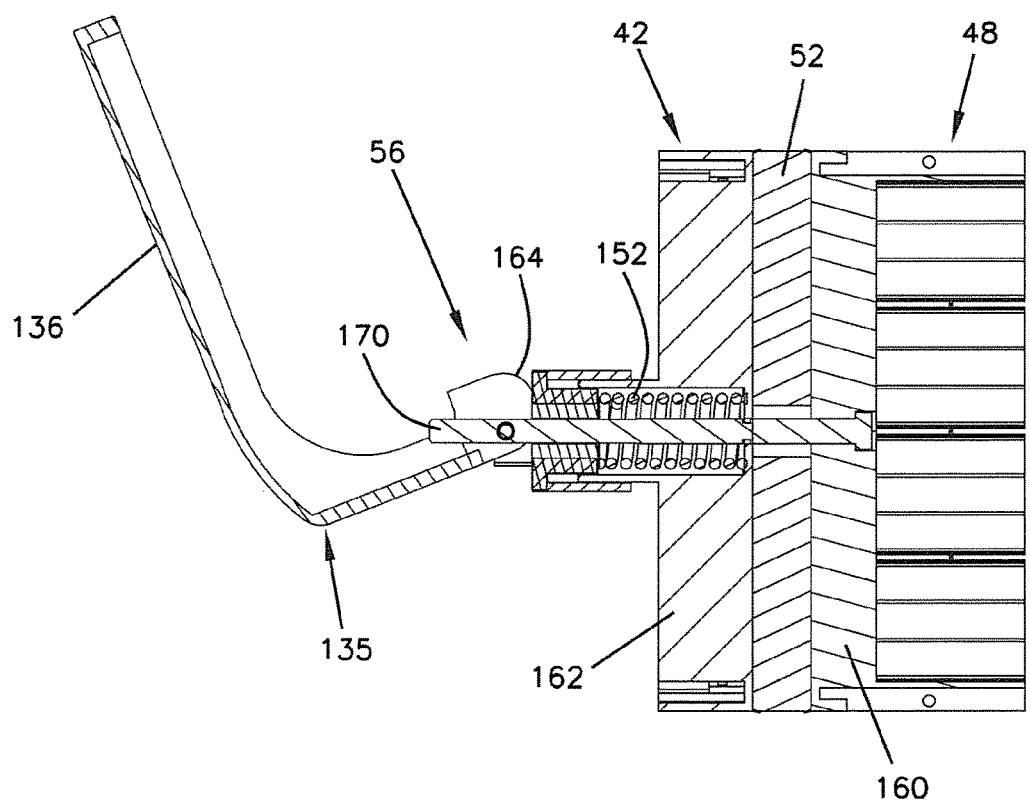
FIG. 7 is a schematic cross-sectional view taken along section line 7-7 of FIG. 6.

Referring to FIG. 7, the actuation arrangement 56 includes inner and outer pressurization structures 160,162 (e.g., plates, members, bodies, etc.). As shown at FIG. 3, the frame 53 is attached to the inner pressurization structure 160 and carried with the sealing unit 42. The sealant arrangement 52 is positioned between the inner and outer pressurization structures 160, 162. The actuation arrangement 56 includes an actuator 135 including a lever arm 136 and a spring 152 for transferring a seal pressurization force from the lever arm 136 to the sealant arrangement 52. The lever arm 136 is movable between an actuated position and a non-actuated position. When the lever arm 136 is moved toward the actuated position, the lever arm 136 generates a seal pressurization force that presses the sealant arrangement 52 between the first and second pressurization structures 160, 162. More specifically, pressurization force from the lever arm 136 is transferred from lever cam surface 164 through the spring 152 and through a shaft 170 to the inner and outer pressurization structures 160, 162. In this way, the first and second pressurization structures 160, 162 are spring biased toward one another such that spring pressure is applied to the sealant arrangement 52 for pressurizing the sealant arrangement 52 to maintain the seals over an extended period of time. In alternative embodiments, the actuation arrangement 56 can include multiple actuators or other types of actuators (e.g., screw-drive type actuators). When the sealant arrangement 52 is pressurized, the sealant arrangement 52 fills voids within the base 26 and presses against the base 26 to form a peripheral seal within the interior of the base 26. Concurrently, the sealant arrangement 52 seals against the outer surface of cables routed through the cable ports of the sealing unit 42 so as to form seals around the cables passing through the cable ports.

In certain embodiments, the base 26 is configured to be attached to an outside environmental structure such as a wall, a bracket, a handhold, a pole, a cable or other structure. As depicted in the figures, the base includes one or more mounting flanges 70 for affixing the housing to another structure.

As shown at FIG. 3, telecommunications components, such as management trays, are mounted within the housing 22. The management trays can be configured for managing and storing excess optical fiber, for supporting and protecting splices, for supporting and protecting optical splitters and performing other functions. The trays are shown pivotably mounted to the frame 53 carried with the sealing unit 48. The frame 53 and the sealing unit 48 can be removed from the housing 22 by sliding the sealing unit 48 and the frame 53 out of the housing as a unit through the outer end 36 of the base 26. A cable fixation structure 80 is also carried with the sealing unit 48. The cable fixation structure 80 is configured for anchoring cable strength members corresponding to cables routed through the cable ports of the sealing unit to the sealing unit or the frame. Typical cable strength members include aramid yarn, fiber reinforced glass rods, metal wires or other structures used to provide tensile and/or compressive reinforcement to a telecommunications cable. By anchoring the strength members to the sealing unit 42 and by fixing the sealing unit 42 to the housing (e.g., via the retention mechanism 55) tensile loads applied to the cables are directed through the sealing unit 42 and transferred to the housing 22 to prevent the load from passing to exposed fibers of the optical cables within the enclosure 20. Because the housing 22 is connected to an outside environmental structure through the flanges 70 on the base 26, the loading is ultimately transferred to the outside environmental structure.

The cable fixation structure 80 can include any type of structure for anchoring cables to the sealing unit 48. For example, the cable fixation structure 80 can include locations where cable jackets can be clamped with cable clamps or tied down with cable tie downs. Alternatively, the cable fixation structure 80 can include fasteners (e.g., screws, bolts, clamps, etc.) or other retaining mechanisms for fixing cable strength members to the sealing unit 48. In a preferred embodiment, the cable fixation structure 80 is carried with or provided as part of the inner pressurization structure 160, and the sealing unit 48 is fixed relative to the base/housing by axially fixing the inner pressurization structure 160 to the base 26 or other part of the housing 22. For example, the retention mechanism 55 can preferably engage and interlock with the inner pressurization structure 160 when in the retaining position so as to restrict axial movement of the inner pressurization structure within the base 26. In this way, tensile or compressive loading applied to the pressurization structure 160 through the cables is transferred through the base 26 to the outside environmental structure and does not cause movement of the inner pressurization structure 160. This transfer is advantageous because movement of the inner pressurization structure 160 could otherwise cause loading to be applied to optical fibers within the enclosure and could also compromise seal integrity.

Figure 6:
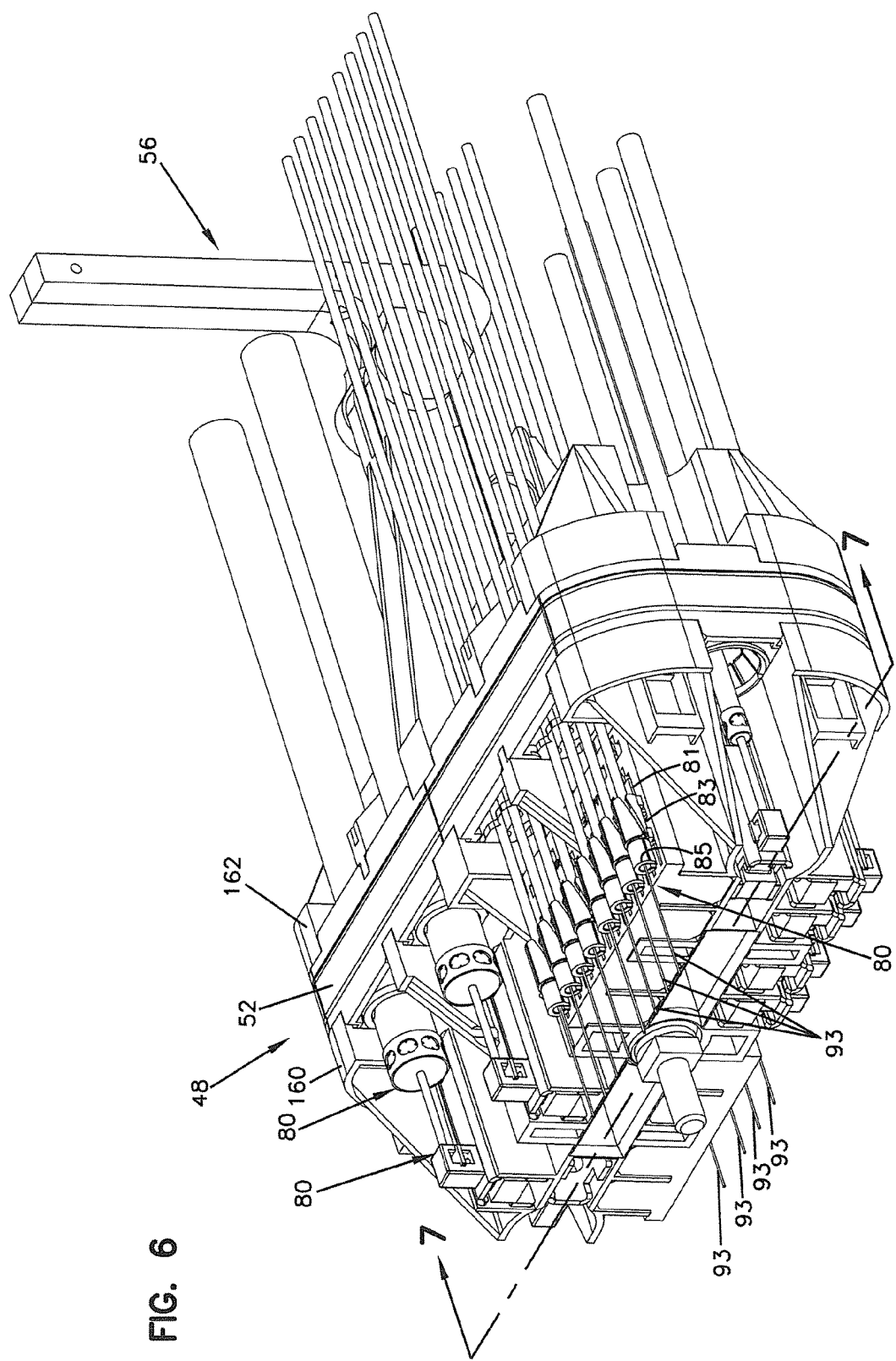
FIG. 6 is another perspective view a sealing unit and telecommunication component support frame of the telecommunications enclosure of FIG. 1.
Figure 8:
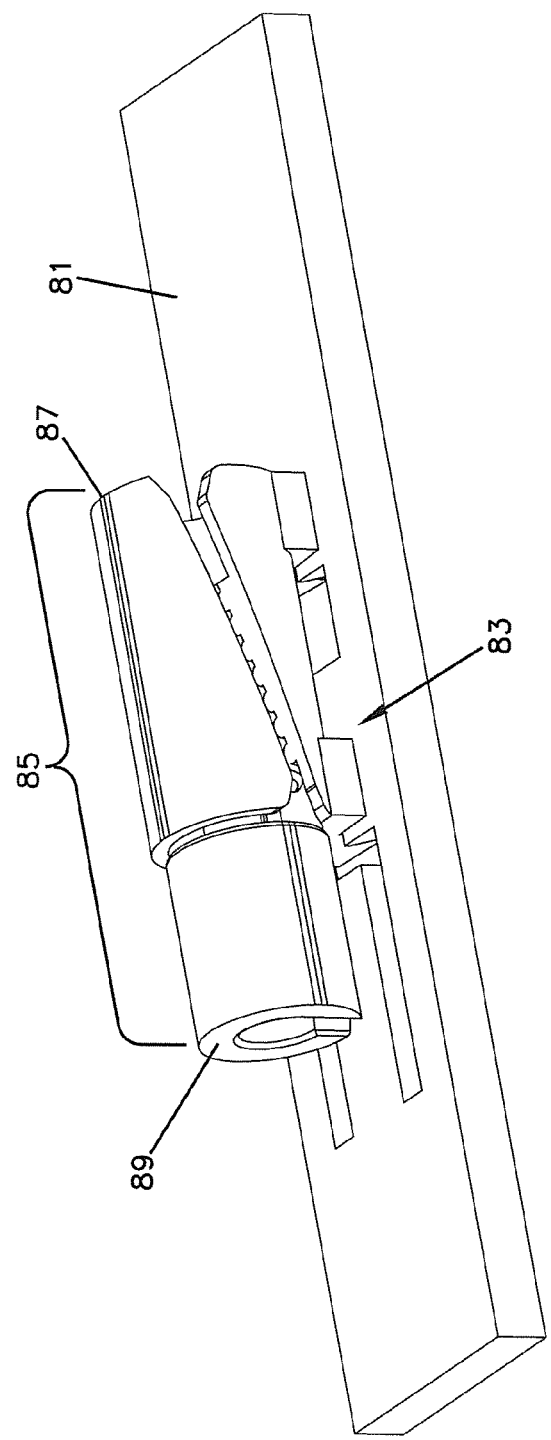
FIG. 8 is a perspective view of a cable anchoring arrangement that can be used to secure cables to an inner pressurization structure of the sealing unit of FIG. 3.
Figure 9:
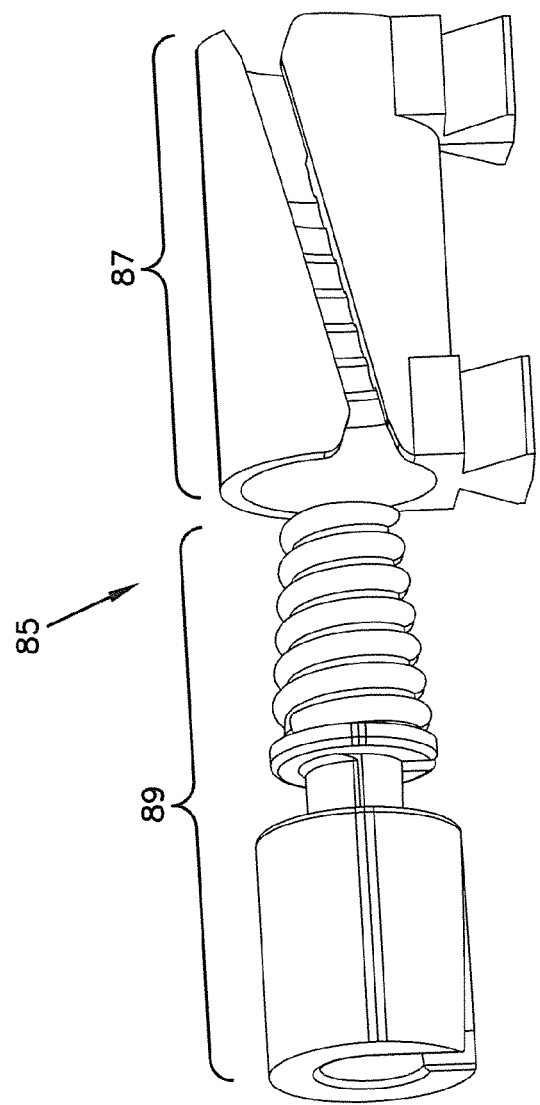
FIG. 9 is another perspective view of the cable anchoring arrangement of FIG. 8.
Figure 10:
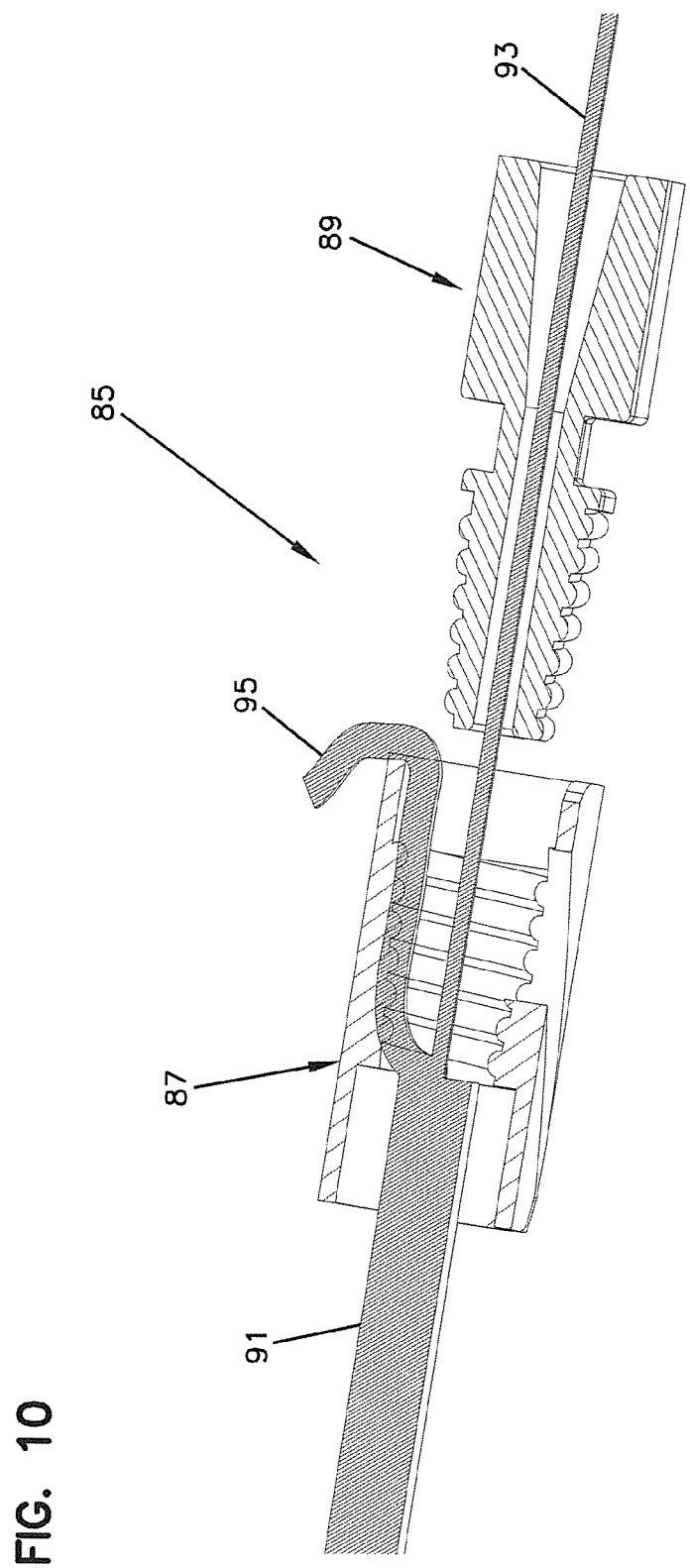
FIG. 10 is a cross-sectional view of the cable anchoring arrangement of FIG. 8.
Figure 11:
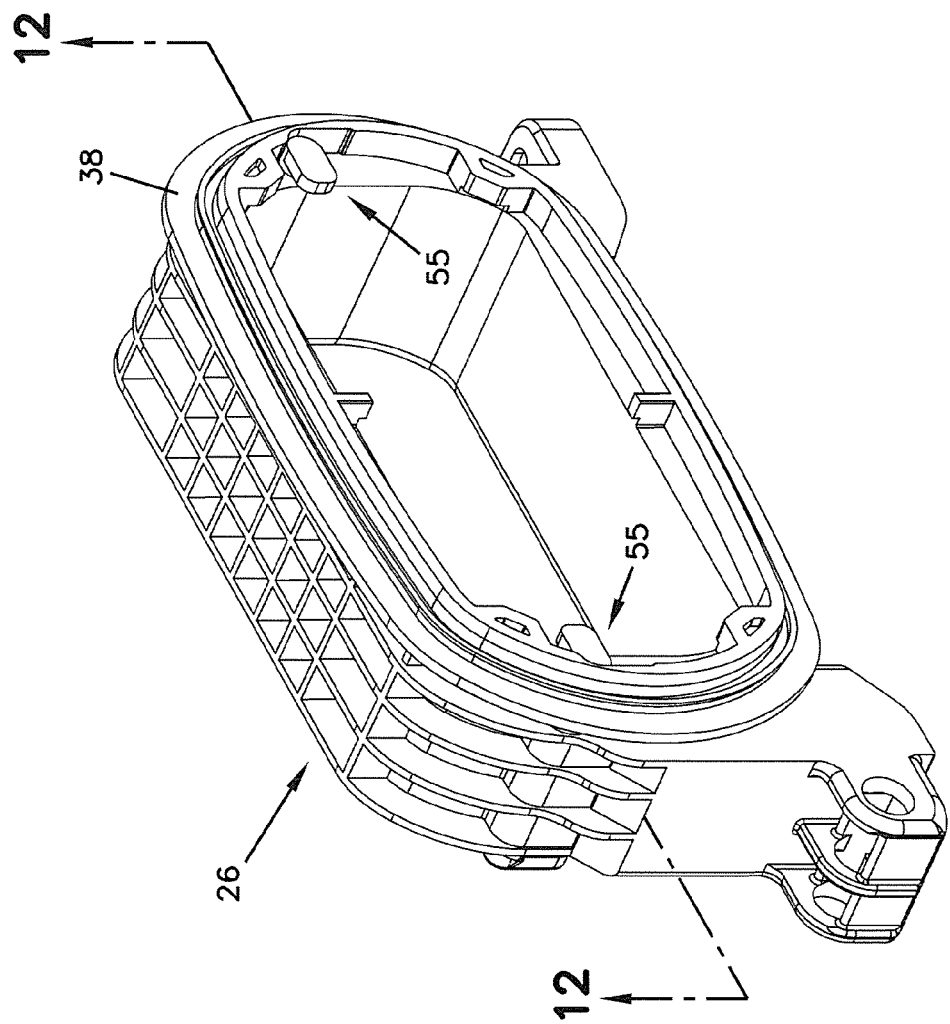
FIG. 11 is a perspective view of a base of the telecommunications enclosure of FIG. 1, a sealing unit latching arrangement is shown incorporated into the base.
Figure 12A:
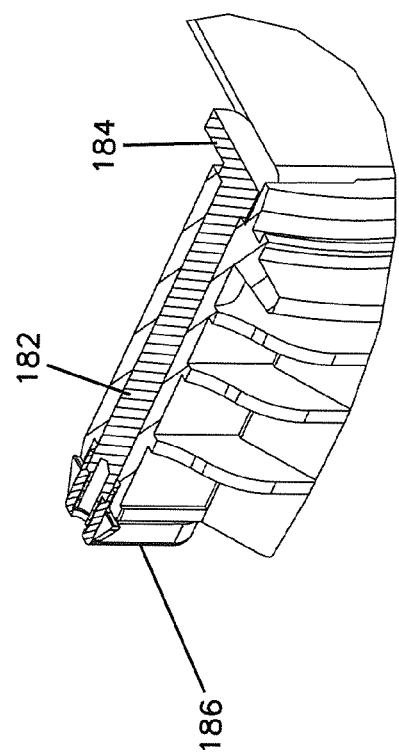
FIG. 12A is an enlarged view of a portion of FIG. 12.
Figure 12:
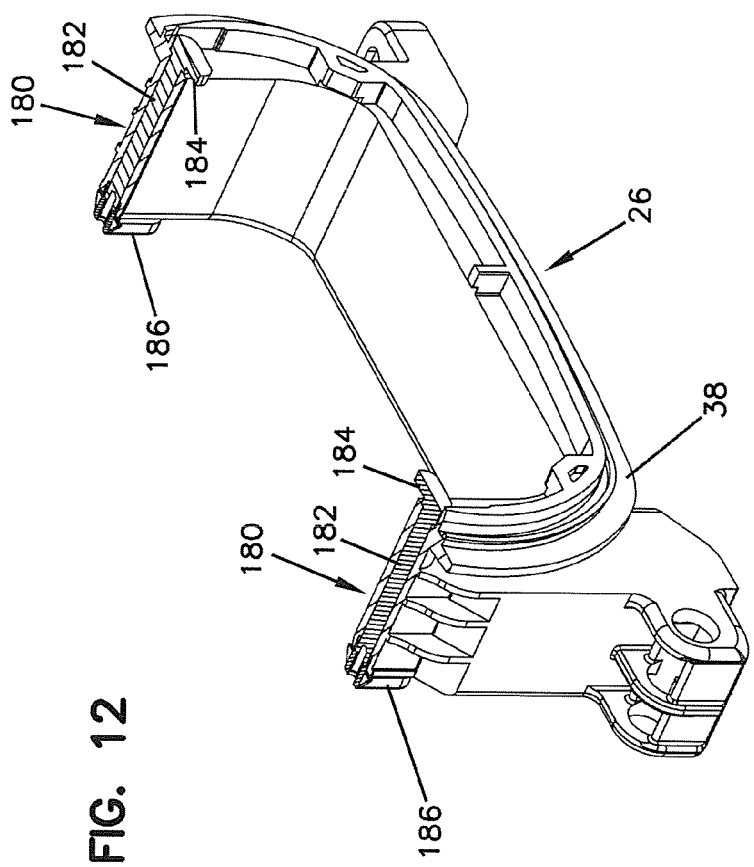
FIG. 12 is a cross-sectional view taken along section line 12-12 of FIG. 11.
Figure 13:
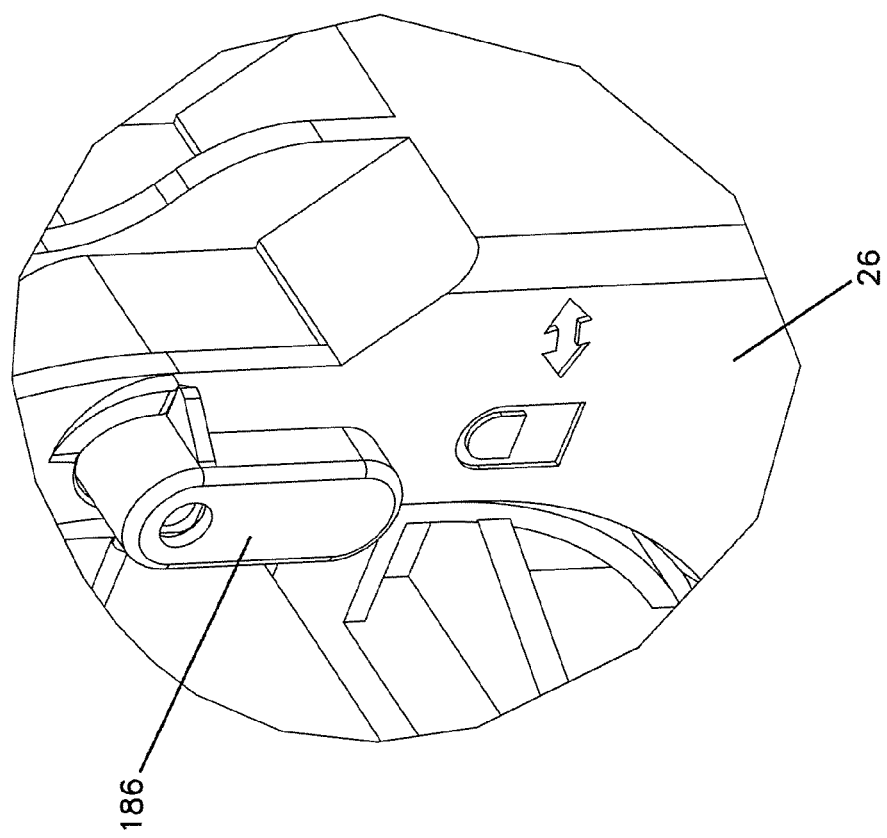
FIG. 13 shows an actuator of the sealing unit latching arrangement of FIG. 11.

Referring to FIG. 6, the cable fixation structure 80 includes a cable fixation platform/plate 81 incorporated as part of the inner pressurization structure 160. The cable fixation plate 81 defines a plurality of fixation locations 83 in the form of openings where strength member clamping devices 85 can be secured. As shown at FIGS. 8-10, the clamping devices include internally threaded sleeves 87 that mount to the fixation plate 81 (e.g., by a snap-fit connection, by an interlocking slip fit connection, etc.). The clamping devices 85 also include externally threaded plugs 89 that thread within the internally threaded sleeves 87. A shown at FIG. 10, a cable 91 can be fixed relative to the clamping device 85 by passing an optical fiber 93 of the cable 91 through the clamping device 85 and into the enclosure 20, and by locking a strength member 95 of the cable 91 between the threads of the plug 89 and the sleeve 87.

Figure 14:
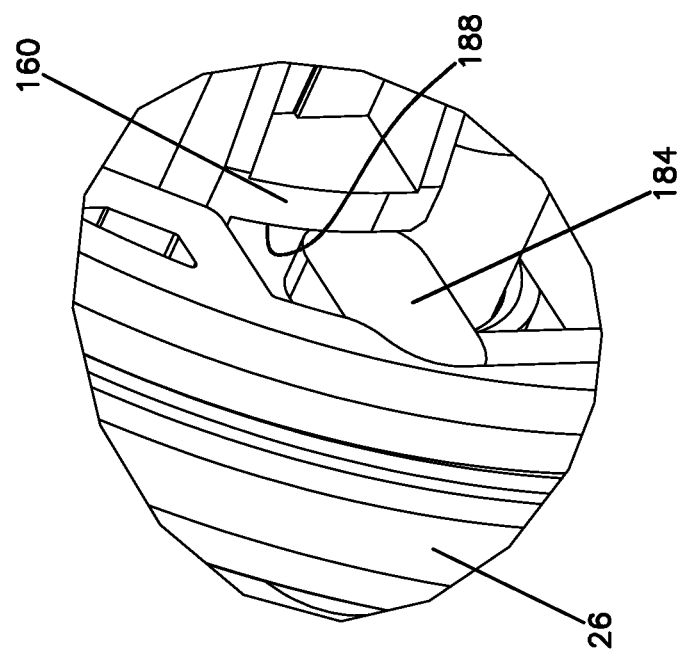
FIG. 14 shows a latch of the sealing unit latching arrangement of FIG. 11.
Figure 15:
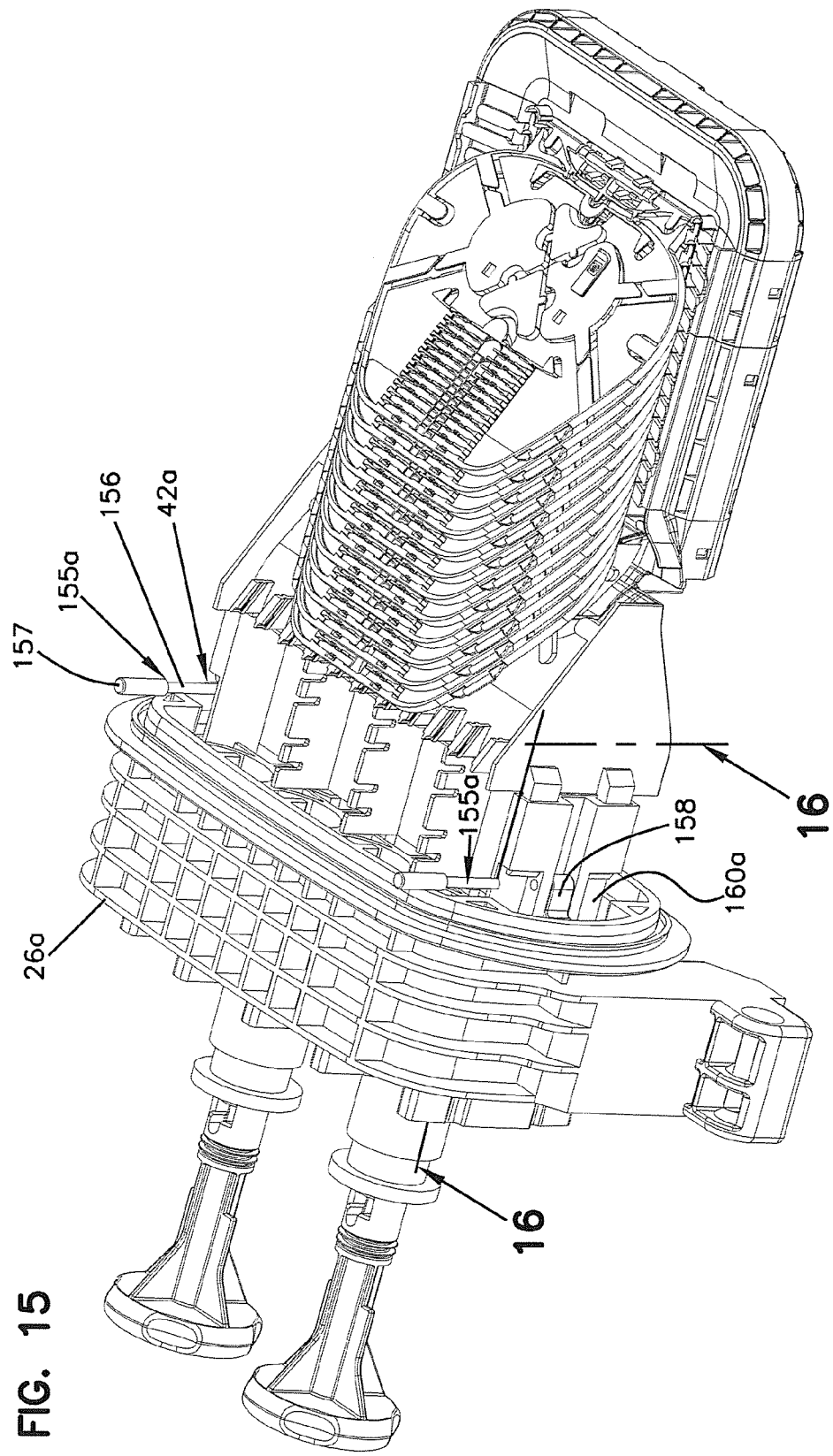
FIG. 15 is a perspective view of an alternative sealing unit and frame inserted within a housing base in accordance with the principles of the present disclosure.
Figure 15A:
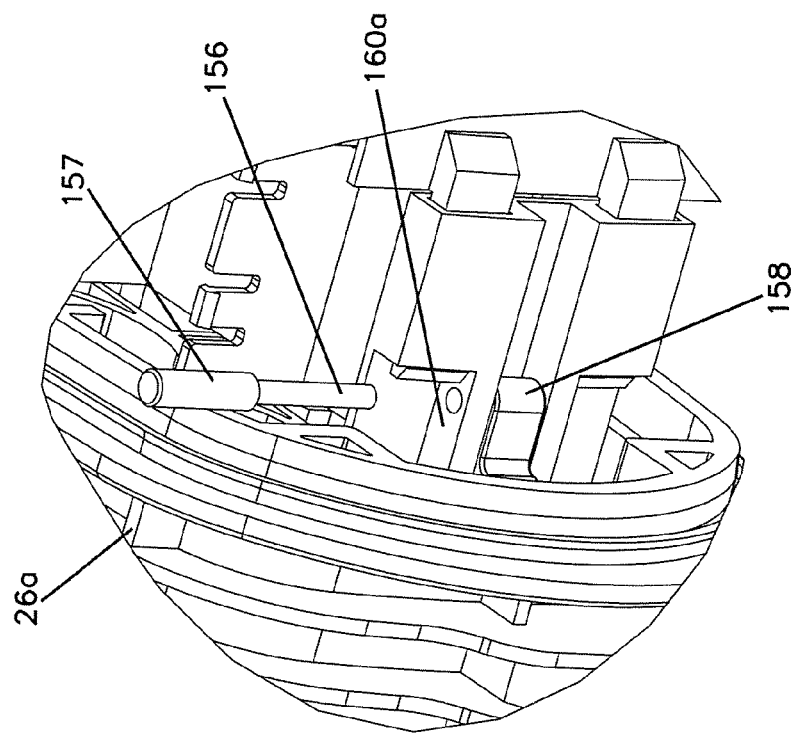
FIG. 15A is an enlarged view of a portion of FIG. 15 showing a sealing unit attachment arrangement in accordance with the principles of the present disclosure, the attachment arrangement is shown in a non-attaching position.
Figure 15B:
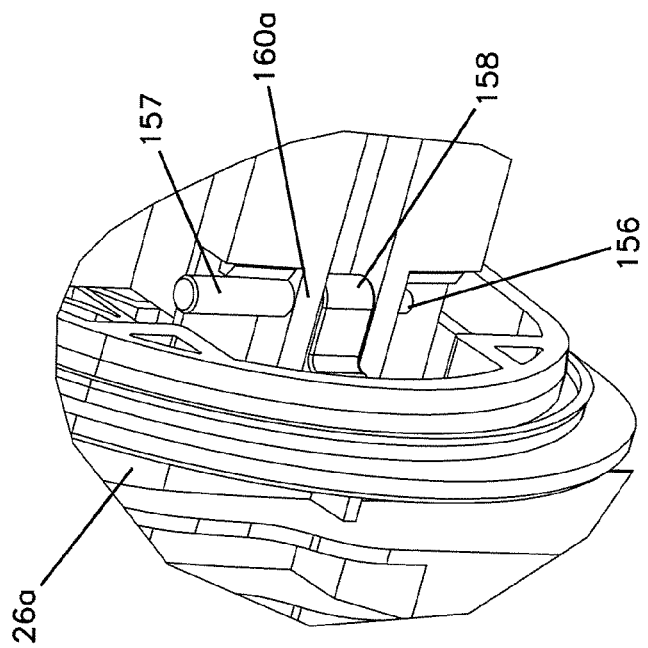
FIG. 15B shows the sealing unit attachment arrangement of FIG. 15A in an attaching position.
Figure 16A:
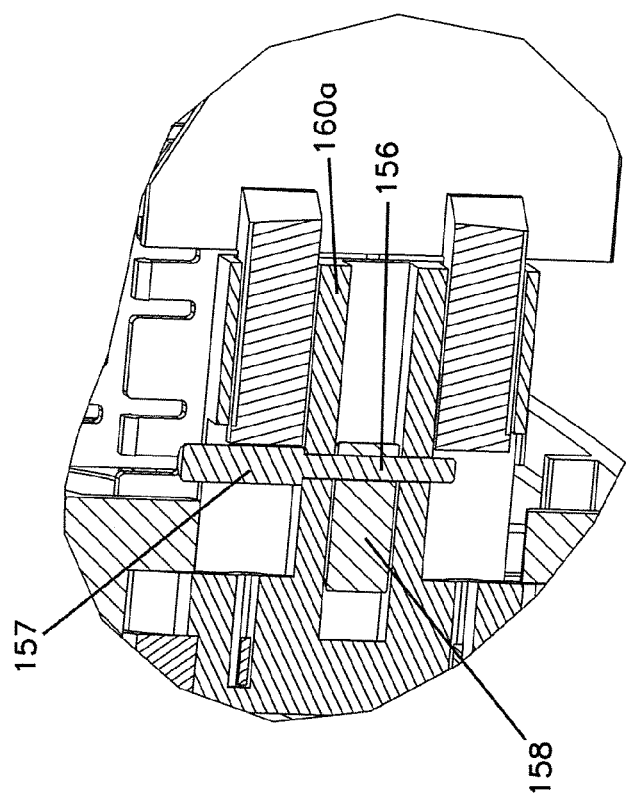
FIG. 16A is an enlarged view of a portion of FIG. 16.

FIGS. 11-14 show the retention arrangement 55 of the enclosure 20. The retention arrangement 55 includes two latching elements 180 each including a shaft 182 pivotally mounted within a side wall of the base 26. Latches 184 are coupled to inner ends of the shafts 182 and handles/actuators 186 are coupled to outer ends of the shafts 182. The actuators 186 are accessible from outside the enclosure 20 (see FIG. 1). Thus, the retention arrangement 55 can be moved between the retaining and non-retaining positions from outside the enclosure 20 without having to open the enclosure 20. When in the retention arrangement 55 is in retaining position (see FIGS. 11, 12 and 14), the latches 184 engage or interlock with a portion of the inner pressurization structure 160 such that the sealing unit 42 is prevented from moving axially within the base 26 (see FIG. 4). As shown at FIG. 14, the latches 184 fit within slots 188 defined by the inner pressurization structure 160 to lock the sealing unit 42 in place relative to the base 26. When the retention arrangement 55 is in the non-retaining position, the latches 184 disengage from the inner pressurization structure 160 so that the sealing unit 42 can be pulled axially out of the base 26 through the outer end of the base 26.

In use of the telecommunications enclosure, the housing 22 is affixed to an environmental structure (e.g., a wall, a pole, a handhold, a bracket, a cable, etc.) by attaching the base 26 to the environmental structure. The structure of the enclosure 20 allows the telecommunications components within the housing 22 to be accessed by removing the cover 24 from the base 26 without detaching the base 26 from the environmental structure. Furthermore, the telecommunications components can be accessed by removing the cover 24 from the base 26 without disturbing the sealing unit 48 pressurized within the base 26. The telecommunications components within the housing 22 can also be accessed by removing the sealing unit 48 from the housing 22 by sliding the sealing unit 48 through the outer end of the base 26. The telecommunications components, the frame 53, the cable fixation structures 80, and the trays are carried with the sealing unit 48 through the outer end of the base 26. This allows the entire assembly to be removed from the mounting location and carried to a remote location (e.g., a work station or work table in a service vehicle) for further processing such as optical splicing or other processing.

FIGS. 15, 15A, 15B, 16 and 16A show an alternative sealing unit 42a and base 26a in accordance with the principles of the present disclosure. A retention pin arrangement 155a is used to selectively couple an inner pressurization structure 160a of the sealing unit 42a to the base 26a. The retention pin arrangement 155a is moveable between a non-retaining position (see FIGS. 15 and 15A) and a retaining position (see FIGS. 15B, 16 and 16A). The retention pin 155a includes a lock portion 156 and a grip portion 157. The lock portion 156 is sized to fit through openings defined in the inner pressurization structure 160a and a tab 158 of the base 26a. The grip portion 157 is sized to not fit through the openings. The retention pin arrangement 155a is not accessible from outside the enclosure. Thus, the cover 24 is removed from the base 26a to provide access for moving the retention pin arrangement 155a between the retaining position and the non-retaining position.

FIGS. 17-20 illustrate another telecommunications enclosure 220 in accordance with the principles of the present disclosure. The enclosure includes a housing 222 having a main housing body 224 defining a first end 226 and a second end 228. The main housing body 224 also defines an end opening 230 at the second end 228. In the depicted embodiment, the housing 222 is a dome-style housing and the enclosure 220 is a dome-style enclosure. The enclosure 220 also includes a sealing unit 232 (see FIG. 20) that fits within the end opening 230. The sealing unit 232 defines a plurality of cable ports. The sealing unit 232 also includes a sealant arrangement 236 (e.g., see the sealant arrangement 52 of FIG. 4) for sealing the cable ports and for providing a peripheral seal within the end opening 230 between the housing 222 and the cable sealing unit 232. The sealing unit 232 further includes an actuator 238 for pressurizing the sealant arrangement 236 within the end opening 230. The actuator 238 is depicted as including lever arms 240 movable between a non-actuated position P1 (see FIG. 17) and an actuated position P2 (see FIG. 18). In other embodiments, the actuator 238 can include other types of structures suitable for pressurizing the sealant arrangement 236 such as threaded actuators or other structures.

Figure 19:
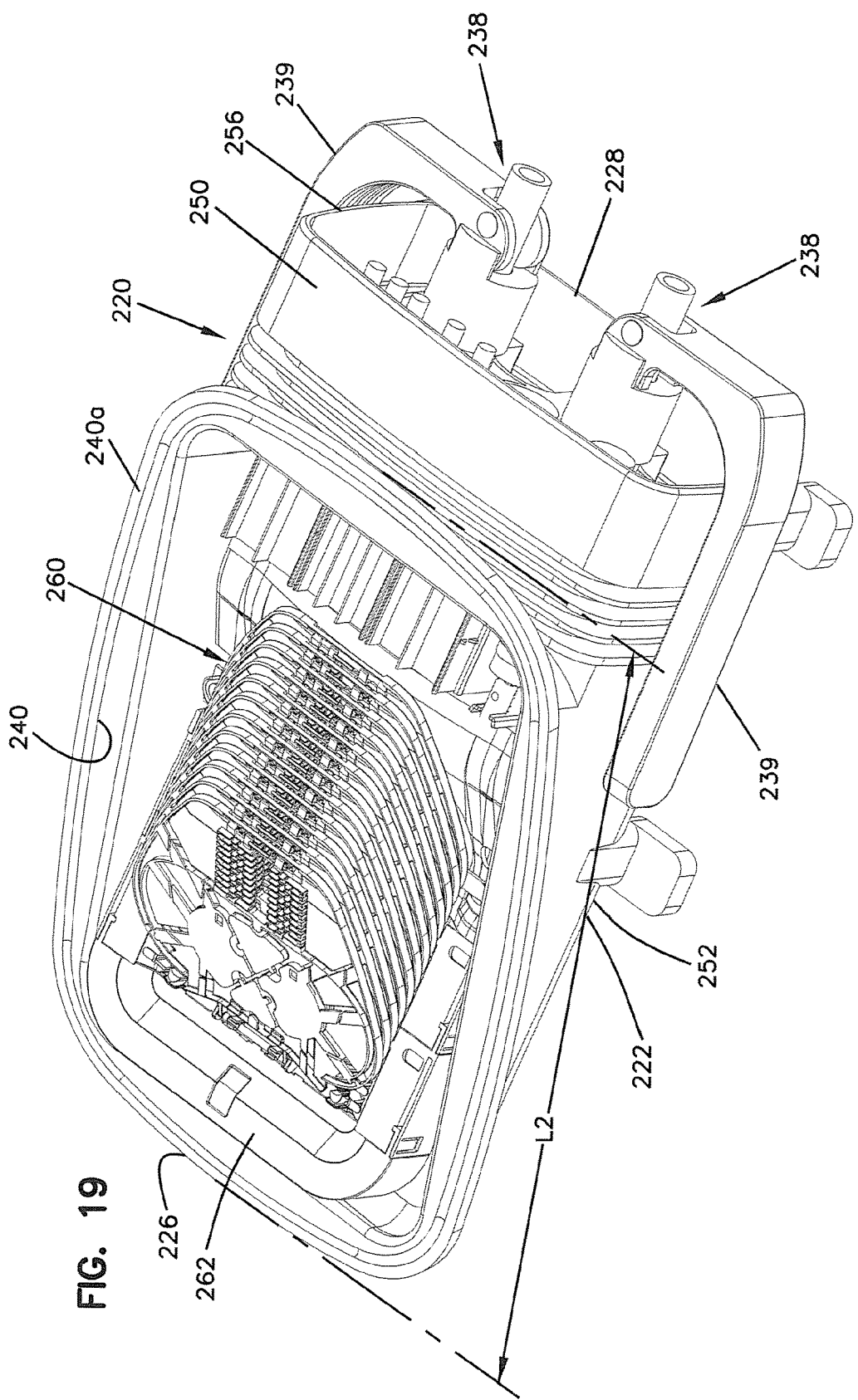
FIG. 19 is a perspective view of the telecommunications enclosure of FIG. 17 with a side cover removed.

The main housing body 224 of the housing 222 also defines a side opening 240 for accessing an interior of the main housing body 224 (see FIG. 19). The side opening 240 is separate from the end opening 230. The housing 222 also includes a side cover 242 that mounts to the main housing body 224 for covering the side opening 240. In a preferred embodiment, removal of the side cover 242 from the main body 224 is independent of the sealing unit 232 such that removal of the side cover 242 does not require the actuator 238 to be moved to the non-actuated position P2 and removal of the side cover 242 from the main housing body 224 while the cable sealing unit 232 is pressurized does not cause de-pressurization of the sealing arrangement 236 of the cable sealing unit 232.

In the depicted embodiment, the side opening 240 and the end opening 230 are completely independently defined with respect to each other. The side cover 242 is shown secured to the main housing body 224 by a clamp 246. The side cover 242 includes a cover flange 242A that extends around a perimeter of the cover 242. The main housing body 224 defines a side opening flange 240A that extends around a perimeter of the side opening 240. The side cover 242 is secured to the main housing body 224 by a channel clamp 246 having a channel 248 that receives the cover and opening flanges 242A, 240A and that extends around the perimeters of the side opening 240 and the side cover 242.

The housing 222 includes opposite first and second major sides 250, 252 that extend between the first and second ends 226, 228 of the main housing body 224. The housing 222 also includes opposite first and second minor sides 254, 256 that extend between the first and second ends 226, 228 of the main housing body 224 and that also extend between the first and second major sides 250, 252. In certain embodiments, the minor sides 254, 256 have larger heights at the second end 228 of the main housing body 224 as compared to at the first end 226 of the main housing body 224.

Figure 17:
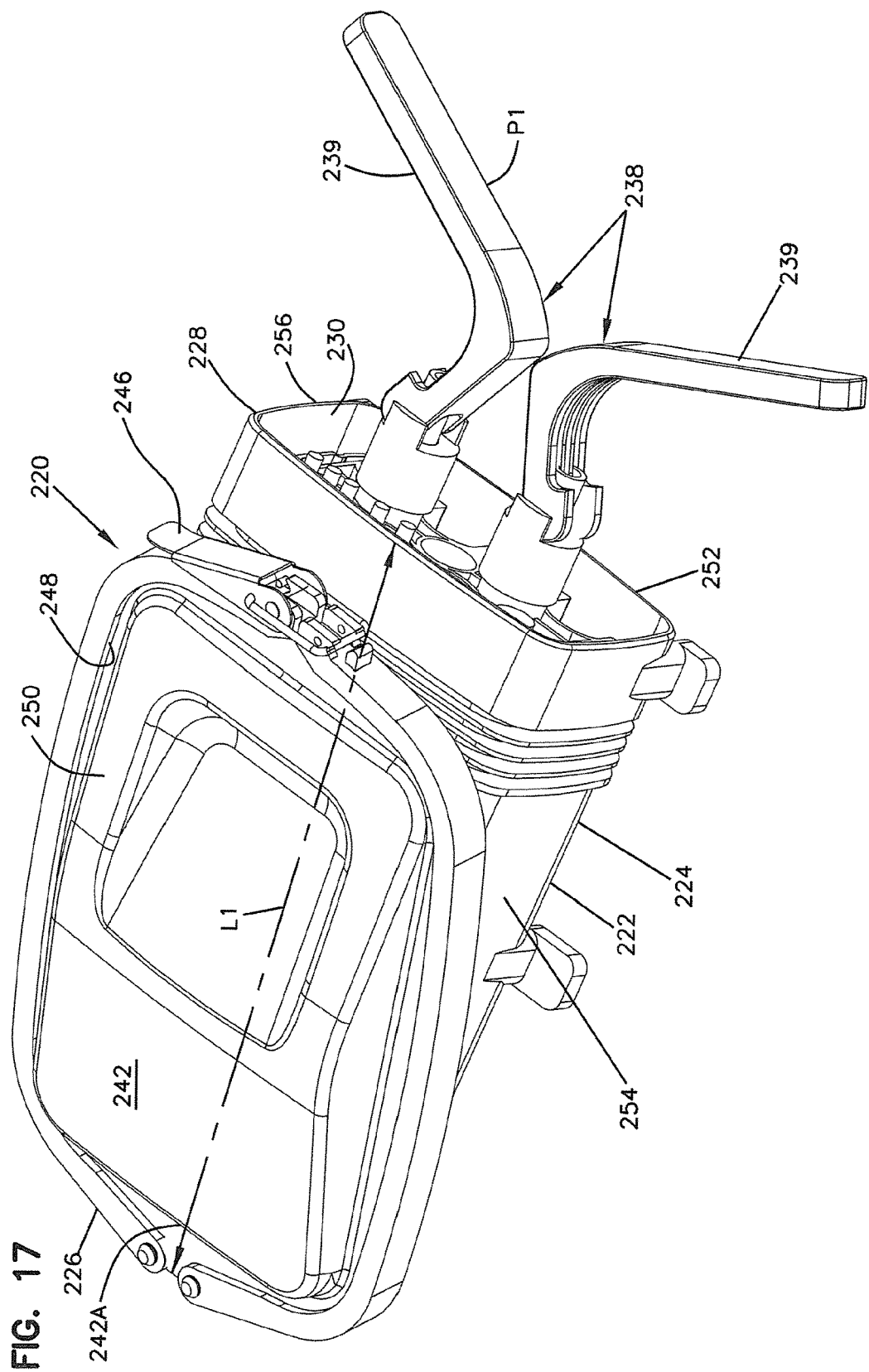
FIG. 17 is a perspective view of another telecommunications enclosure in accordance with the principles of the present disclosure, a sealing unit of the enclosure is shown in a non-actuated position.
Figure 18:
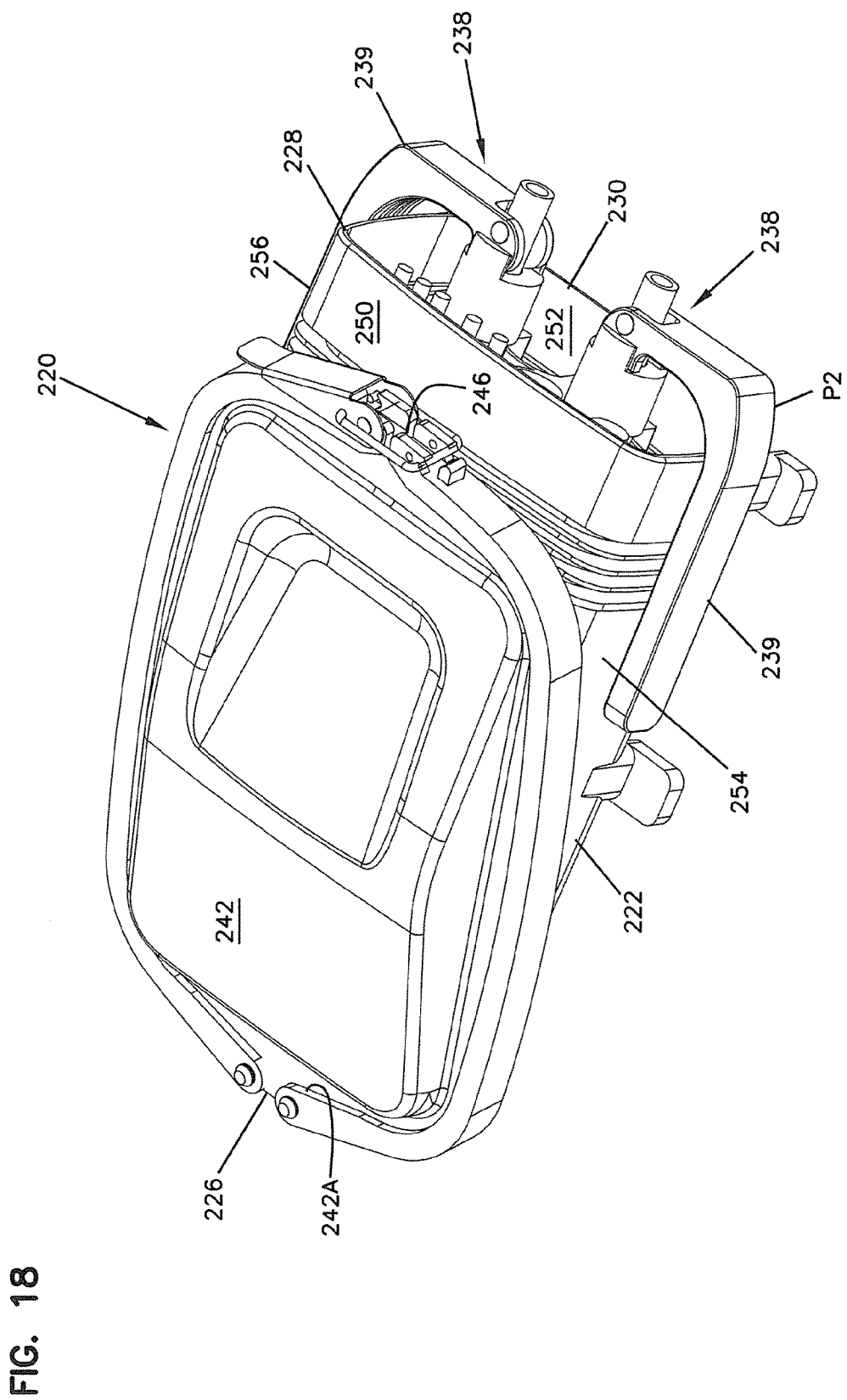
FIG. 18 is a perspective view of the telecommunications enclosure of FIG. 17 with the sealing unit shown in an actuated position.

A majority of the first major side 250 is defined by the side cover 242 of the housing 222. The side cover 242 is angled relative to the second major side 252 such that the side cover 242 and the second major side 252 converge toward one another as the side cover 242 and the second major side 252 extend toward the first end 226 of the main housing body 224. The main housing body 224 defines a first length L1 between the first and second ends 226, 228 (FIG. 17). The side opening 240 has a second length L2 that extends between the first and second ends 226, 228 of the main housing body 224 (FIG. 19). The second length L2 is shorter than the first length L1. In certain embodiments, the second length L2 is at least half as long as the first length L1. In certain embodiments, the second length L2 starts at the first end 226 of the main housing body 224 and ends at an intermediate position between the first and second ends 226, 228 of the main housing body 224.

Referring to FIG. 19, management trays 260 are positioned within the main housing body 224. In certain embodiments, the management trays 260 can be configured for managing telecommunications components such as optical fibers, excess lengths of optical fibers, optical splitters, optical splices or other components. It will be appreciated that the management trays 260 can be accessed through the side opening 240 without disturbing the sealing unit 232.

Figure 20:
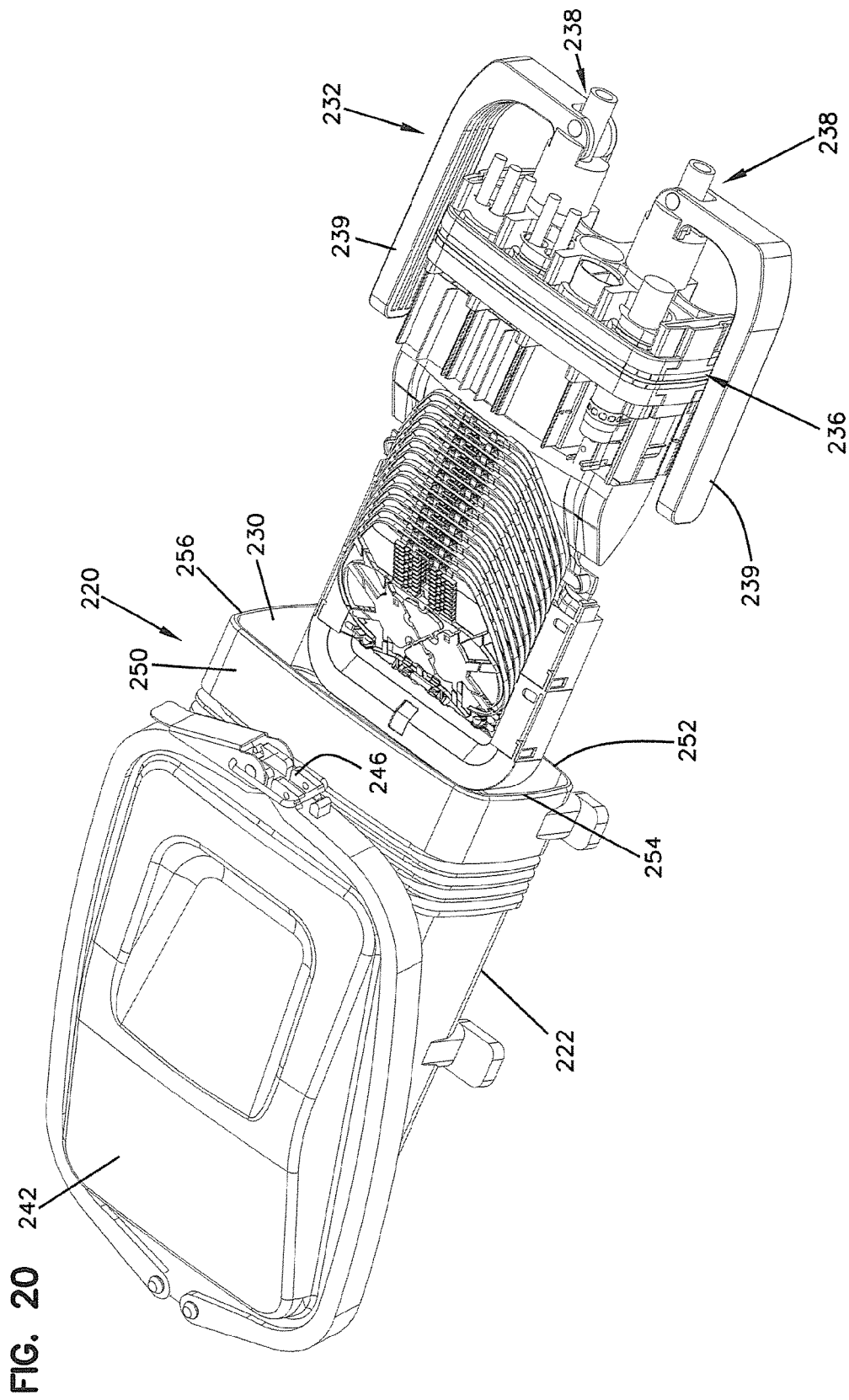
FIG. 20 is an exploded view of the telecommunications enclosure of FIG. 17 with the sealing unit removed.

Referring FIGS. 19 and 20, the management trays 260 are mounted to a frame 262 connected to and carried with the sealing unit 232. A cable fixation structure of the type described above can also be carried with the sealing unit 232. In a preferred embodiment, the sealing unit 232, the cable fixation structure and the frame 262 all can be removed from the housing 222 as a unit by sliding the sealing unit 232 and the other structures carried therewith outwardly from the housing 222 through the end opening 230. A retention arrangement of any of the types described above can be used to selectively axially lock the sealing unit 232 within the housing 222. For example, one or more retention pins 155a (FIGS. 15 and 16) may be used to selectively axially lock the sealing unit 232 within the housing 222.

It will be appreciated that various materials can be used to form the sealant arrangement 52, 236. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the sealing members may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

LIST OF REFERENCE NUMERALS AND CORRESPONDING FEATURES 20 enclosure
22 housing
24 cover
26, 26a base
28 open end
30 closed end
32 cover flange
34 inner end
36 outer end
38 base flange
40 central axis
42 clamp
42a alternative sealing unit
48 sealing unit
50 cable ports
52 sealant arrangement
53 frame
55 retention arrangement
56 actuation arrangement
70 flanges
80 cable fixation structure
81 cable fixation plate
83 fixation locations
85 clamping device
87 sleeve
89 plug
91 cable
93 optical fiber
95 strength member
135 actuator
136 lever arm
152 spring
155a retention pin arrangement
156 lock portion
157 grip portion
158 tab
160, 160a inner pressurization structure
162 outer pressurization structure
164 lever cam surface
170 shaft
180 latching elements
182 shaft
184 latches
186 handle
188 slots
220 enclosure
222 housing
224 main housing body
226 first end
228 second end
230 end opening
232 sealing unit
236 sealant arrangement
238 actuator
239 lever arms
240 side opening
240A side opening flange
242 side cover
242A cover flange
246 clamp
248 channel 250 first major side
252 second major side
254 first minor side
256 second minor side
260 management trays
262 frame
L1 first length
L2 second length
P1 non-actuated position
P2 actuated position

The invention claimed is:

1. An enclosure comprising:
a housing including a cover and a base, the cover having an open end positioned opposite from a closed end, the cover including a cover flange that extends around a periphery of the cover at the open end of the cover, the base being a hollow sleeve having an inner end and an outer end, the base including a base flange the extends around a periphery of the base at the inner end of the base;
a clamp that receives the cover flange and the base flange to couple the cover and the base together;
a sealing unit that fits within the base, the sealing unit defining a plurality of cable ports, the sealing unit including a sealant arrangement for sealing the cable ports and for providing a peripheral seal between the base and the cable sealing unit;
an actuator carried with the sealing unit for pressurizing the sealant arrangement within the base;
the base lacking a permanent retention structure at the outer end of the base for retaining the sealing unit in the base;
the sealing unit being removable from the base by de-pressurizing the sealant arrangement and sliding the sealing unit outwardly from the base through the outer end of the base; and
the cover being removable from the base without requiring the sealant arrangement to be de-pressurized.

2. The enclosure of claim 1, wherein the base is configured to be attached to a structure such as a handhold, a wall or a pole.

3. The enclosure of claim 1, wherein the base includes one or more mounting flanges for affixing the housing to another structure.

4. The enclosure of claim 1, wherein one or more telecommunications components are mounted within the housing.

5. The enclosure of claim 4, wherein the telecommunications components include optical splitters or optical splices.

6. The enclosure of claim 5, wherein the telecommunications components include trays supporting optical fibers, optical fiber splices or optical splitters.

7. The enclosure of claim 6, wherein the trays are mounted to a frame carried with the sealing unit, wherein the frame and the sealing unit can be removed from the housing by sliding the sealing unit and the frame out of the housing through the outer end of the base.

8. The enclosure of claim 7, wherein a cable fixation structure is also carried with the sealing unit, the cable fixation structure being configured for anchoring strength members corresponding to cables routed through the cable ports of the sealing unit.

9. A method for installing the enclosure of claim 1, the method comprising affixing the housing to an environmental structure by attaching the base to the environmental structure.

10. The method of claim 9, wherein the environmental structure is selected from the group consisting of a wall, a pole and a handhold.

11. The method of claim 9, further comprising accessing a telecommunications component within the housing by removing the cover from the base without detaching the base from the environmental structure.

12. The method of claim 9, further comprising accessing a telecommunications component within the housing by removing the sealing unit from the housing by sliding the sealing unit through the outer end of the base, wherein the telecommunications component is carried with the sealing unit through the outer end of the base.

13. The method of claim 12, wherein the telecommunications component includes an optical fiber tray for supporting an optical splice or an optical splitter, wherein the optical fiber tray is supported on a frame carried with the sealing unit, and wherein the sealing unit, the frame and the optical fiber tray are removed from the housing as a unit through the outer end of the base.

14. The method of claim 13, wherein a fiber optic cable is routed through one of the cable ports of the sealing unit, wherein the fiber optic cable includes a strength element that is anchored to a cable fixation structure carried with the sealing unit, and wherein the fiber optic cable remains anchored to the cable fixation structure as the sealing unit, the frame and the optical fiber tray are removed from the housing through the outer end of the base.

* * * * *